United States Patent
Kaefer et al.

[11] Patent Number: 6,026,992
[45] Date of Patent: Feb. 22, 2000

[54] MEDIA DISPENSER

[75] Inventors: Stefan Kaefer, Eigeltingen; Karl-Heinz Fuchs, Radolfzell, both of Germany

[73] Assignee: Ing. Erich Pfeiffer GmbH, Radolfzell, Germany

[21] Appl. No.: 09/039,144

[22] Filed: Mar. 13, 1998

[30] Foreign Application Priority Data

Mar. 21, 1997 [DE] Germany .......................... 197 11 791

[51] Int. Cl.[7] ................................................ G01F 11/28
[52] U.S. Cl. .......................... 222/453; 222/451; 222/631; 239/345
[58] Field of Search .............................. 222/38, 135, 333, 222/501, 631, 634, 453, 451, 442, 449; 239/345, 376–378

[56] References Cited

U.S. PATENT DOCUMENTS

| | | | |
|---|---|---|---|
| 3,091,374 | 5/1963 | Schwartzman | 222/448 |
| 4,584,847 | 4/1986 | Martello et al. | 222/501 |
| 4,811,869 | 3/1989 | Tremblay | 222/501 |
| 5,209,375 | 5/1993 | Fuchs | 222/38 |
| 5,301,841 | 4/1994 | Fuchs | 222/135 |
| 5,366,122 | 11/1994 | Guentert et al. | 222/631 |
| 5,443,185 | 8/1995 | Fuchs | 222/333 |

FOREIGN PATENT DOCUMENTS

| | | |
|---|---|---|
| 0 296 632 A2 | 12/1988 | European Pat. Off. . |
| 0 296 632 A3 | 1/1991 | European Pat. Off. . |
| 0 604 257 | 6/1994 | European Pat. Off. . |
| 2 261 512 | 9/1975 | France . |
| 2 542 300 | 9/1984 | France . |
| 634916 | 9/1936 | Germany . |
| 2839204 B1 | 4/1979 | Germany . |
| 3803366 A1 | 8/1989 | Germany . |
| 4027749 A1 | 3/1992 | Germany . |
| 4030531 A1 | 4/1992 | Germany . |
| 295 04 835 | 6/1995 | Germany . |
| 725 784 | 3/1955 | United Kingdom . |

OTHER PUBLICATIONS

European Patent Office search report in Appln. No.9810465.4–2308, dated Jul. 3, 1998.
German search report in Appln. No. 197 11 791.0, dated Feb. 16, 1998.

*Primary Examiner*—Andres Q. Kashnikow
*Assistant Examiner*—Dinh Q. Nguyen
*Attorney, Agent, or Firm*—Quarles & Brady LLP

[57] ABSTRACT

A dispenser (1,1*a*) provides for filling a dosing chamber (15,15*a*) by gravity and then emptying it by closing an inlet valve (39,39*a*), by opening an outlet valve (40,40*a*) and by shortening the dosing chamber (15,15*a*) with the assistance of air flow through a discharge port (7,7*a*) and into a cup (80) which in one embodiment is assembled as part of the dispenser (1*a*) and which is removable so that its medium contents can be dispensed. Such a dispenser (1,1*a*) achieves a highly accurate dosing with simple handling and construction.

27 Claims, 2 Drawing Sheets

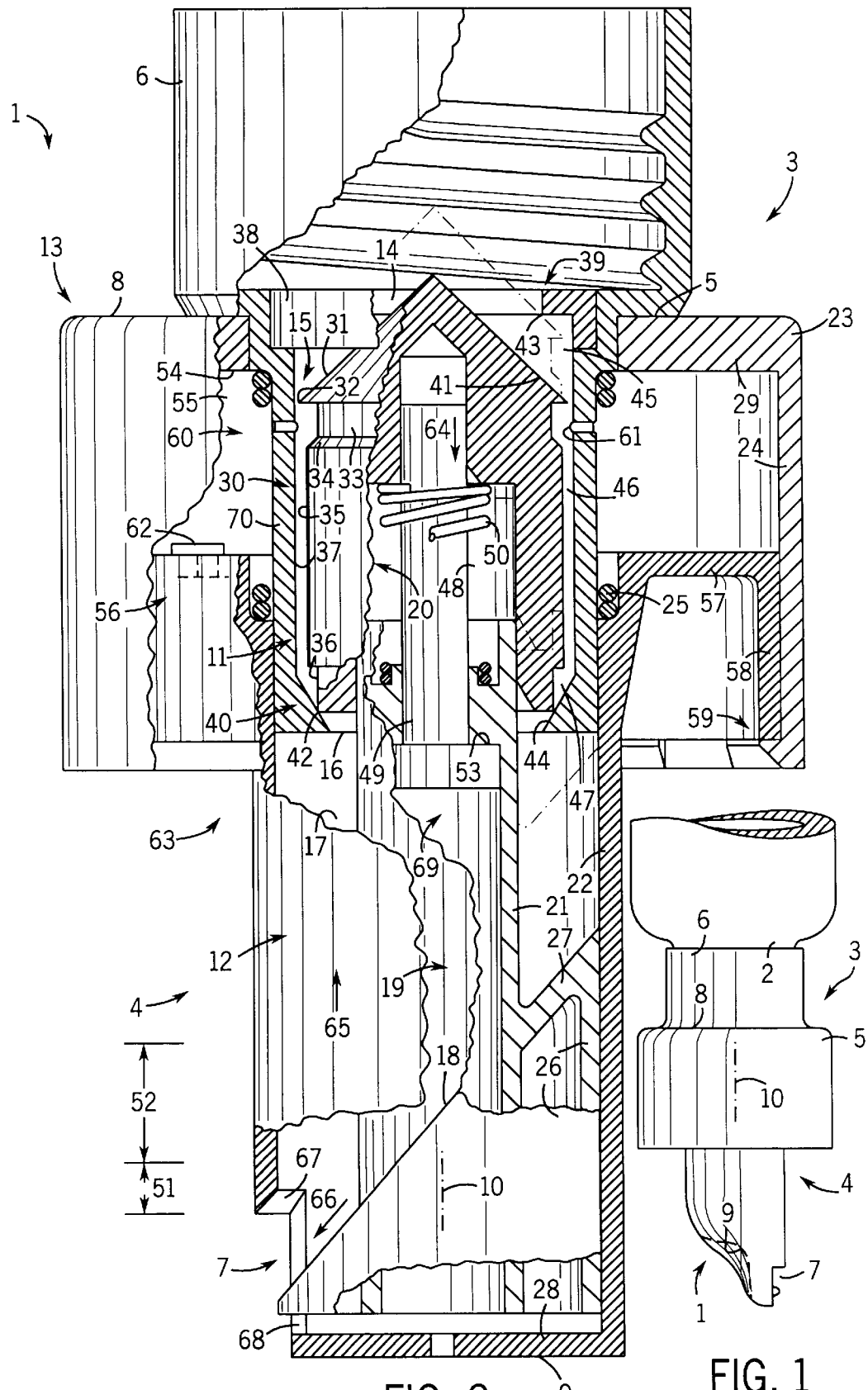

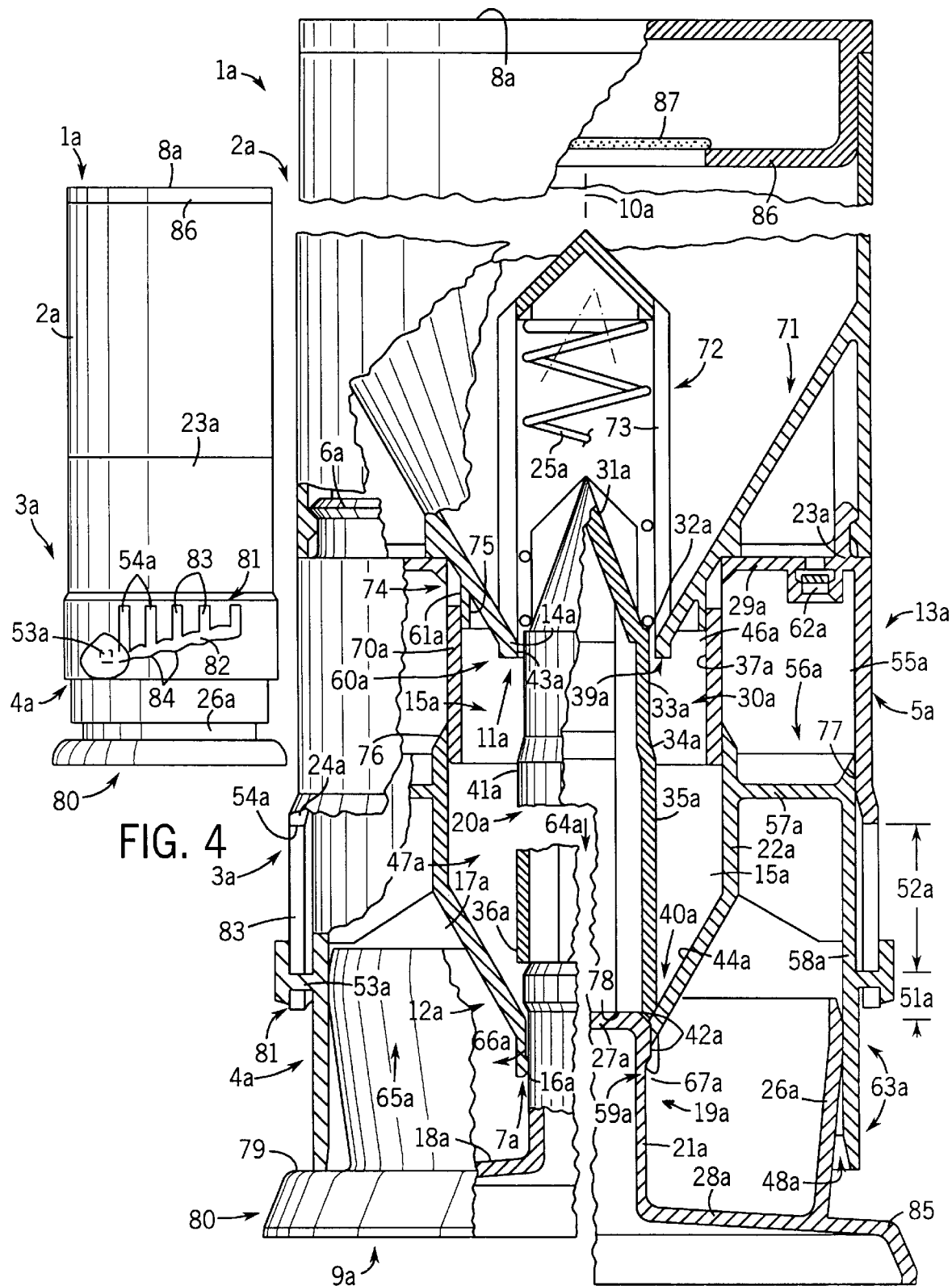

MEDIA DISPENSER

TECHNICAL FIELD AND BACKGROUND OF THE INVENTION

The invention relates to a discharge device for a single medium or multiple media, each of which may be powdery, liquid, pasty, gaseous or the like and provided, more particularly, for pharmaceutical, cosmetic or similar applications. The dispenser is held single handedly and thereby actuated by the fingers of one hand for discharge. The dispenser is made totally of plastic material or injection molded parts so that the media do not come into contact with any metal parts. The dispenser is designed for assembly to one or more medium reservoirs or may be formed with this reservoir means as a unit which is separable only by destruction.

Two or more slidable or flowable media may be conveyed or discharged by the dispenser during a single discharge event or simultaneously with the media being mixed either inside of, or outside of, the device. As a first medium, a non-gaseous medium is provided and, as a second medium, a highly volatile medium, particularly gas or air, is provided, which has a neutral chemical behavior relative to the first medium and particularly promotes its flow. Each medium may be separated from a reservoir prior to discharge in a dosed amount and then discharged. Repeated discharge events are possible by returning the dispenser to its initial position after discharge. The reservoir and the dosing chamber may form a single space which is intended exclusively for emptying so that the dispenser can only expel one single dose. The respective medium chamber can be varied in volume as a pressure chamber to propel the medium out of the chamber to the medium outlet. The stored or dosed amount of medium may also be contained in a capsule to be inserted in the dispenser.

OBJECTS OF THE INVENTION

An object of the invention is to provide a dispenser obviating the drawbacks of the prior constructions or achieving advantages of the dispenser to be described herein. Further, a simple design, for easy handling and precise dosing is desired.

SUMMARY OF THE INVENTION

According to the invention, medium spaces are provided for conveying the medium from at least one medium space to another by gravitation, and more particularly, either partly or completely by its own gravity. The medium thus falling by gravity from one space into the other can be delivered gently, which is expedient with powders or media having similar flow or trickling properties and causes loosening or mixing. Such adjoining medium spaces are provided from the reservoir or the medium chamber up to the medium outlet located within the dispenser or directly connecting to the exterior. They may be chambers, openings, passages or the like which receive the media stream prior to or during discharge and are wide enough to permit the medium's sinking motion without obstruction due to friction or capillary effect.

The dispenser may be oriented in a resting or keeping position, such as a standing position, which relative to a vertical line passing through it departs from the conveying or dispensing position. The dispenser also permits one to convey the medium by gravity counter to the flow direction of the discharge, namely from the medium outlet back into the medium chamber or reservoir when the device is correspondingly oriented relative to the vertical, for instance, in the resting position.

The chamber defining the dosage amount comprises boundary faces which are larger than those of an oblong chamber of the same volume having no core. To nevertheless have boundary faces which are relatively smooth or linear in axial section, the chamber has annular cross-sections. The chamber part defining the dose has a flow cross-section essentially smaller than the inflow cross-section directly adjoining the chamber or the outflow cross-section which is smaller than the inflow cross-section. The inflow cross-section may be at least four or six times larger than this flow cross-section or at least 1.5 to two times larger than the outflow cross-section which in turn may be at least two or three times larger than the flow cross-section. An outlet duct directly adjoining the outflow cross-section has a flow cross-section again essentially larger than all of the cited cross-sections. This duct cross-section is at least 1.5 times larger than the inflow cross-section or larger than the sum of all three cross-sections aforementioned. The duct cross-section like the inflow cross-section is continuously constricted during discharge, however, whilst the outflow cross-section is continuously widened. The constriction serves for closing the inflow cross-section or the widening for opening the outflow cross-section from a closed state. The constriction of the flow cross-section of the outlet duct or the continuous shortening thereof serves to accelerate discharge by reducing the size of the associated medium space, namely of the outlet duct and to ensure the outlet duct being totally emptied.

Within the medium chamber a core body separate from the outer chamber bounds is provided which simultaneously opens and closes the two chamber openings and is movable relative to the medium outlet by a discharge actuator. Although the motions of individual components in discharge actuation may include a rotary motion, the exclusive use of an axial movement is preferred. The dosing or capacity volume of the medium chamber is variable so that it can assume varying values while being filled from the medium reservoir. In each volume setting, which may be incrementally or continuously varied, the medium chamber is locked by setting means with which the maximum actuating length of the discharge actuator is varied. The setting means are manually actuated with the handles used for discharge actuation. The setting actuation occurs transverse to or otherwise departs from the direction of discharge actuation.

A reservoir or conveying unit for the second medium is located in the axis of the medium chamber or parallel thereto and may surround the latter at the outer circumference. A single wall bounds both reservoir or medium chambers with remote faces.

The medium chamber is divided by a dividing means into two chamber parts at a spaced distance from, and between the inflow and outflow, namely into a prechamber adjoining the inflow opening and a dosage chamber adjoining the antechamber downstream. The contents of this dosing chamber are emptied on discharge through the medium outlet. These dividing means may be formed by a fluid flow of the second medium or the like which commences with the start of the discharge actuation, and prior to the inflow opening being totally closed, as well as being maintained up to complete emptying of the dosing chamber. Thereby, a conveying flow is introduced at the upstream end into the dosing chamber. This flow propels the medium downstream and up to the medium outlet so that all medium spaces extending from an input for the flow up to the medium outlet are flushed totally free of the first medium.

All dispenser parts are provided between a flange for their supported connection to the medium reservoir and an end remote therefrom comprising the medium outlet to achieve compactness. The outlet duct can also function as a reservoir receiving one or more dosed volumes from the dosing chamber, whereafter it is emptied through the medium outlet.

The dispenser conveys the medium from the reservoir into the medium chamber solely by being transferred into the inverted or discharged position and without additional manual stroke actuation. In the upright or standing position, the entire dose volume is returned from the medium chamber into the reservoir. By separate activation or manual actuation of a handle, the medium is then released from the medium chamber toward the medium outlet. Only then, the second medium is transferred into discharge flow.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

BRIEF FIGURE DESCRIPTION

Example embodiments are illustrated in the drawings in which:

FIG. 1 is a side view of a dispenser in natural size,

FIG. 2 is an enlarged axial section in a slightly modified embodiment,

FIG. 3 is an illustration of a further embodiment depicting the initial position on the right and first partial stroke position on the left, and FIG. 4 is a side view of the dispenser shown in FIG. 3.

DETAILED DESCRIPTION

The dispenser 1 is fixed against axial and rotational displacement to the constricted neck of a flask-type integral reservoir 2 of glass, plastics material or the like and formed by two units 3, 4 movable axially relative to each other and freely rotational. Unit 3 is formed by a single or multi-part hollow base body 5, which in turn forms three axially adjoining or nested caps. One of the caps is a flange 6 for rigid connection to the reservoir neck and therefor has on the inner circumference thread or snap members or on the outer circumference a fastener, such as a crimp ring. At the end of dispenser 1 remote from flange 6 unit 4 has on its outer circumference and/or in the end face as a medium port 7 over a partial circumference of less than 180° or 90° a sole orifice, from which the medium is released from the dispenser 1 and which has a passage width of at least 10, 20 or 30 mm².

From port 7 the medium can be discharged directly into a receptacle, such as a drinking glass, a spoon or the like or orally administered. FIGS. 1 and 2 show one of the dispensing or dispense positions which may also differ from each other and in which the port 7 is located below components 2, 3, 5, 6. In the resting position which as compared to the inverted position is turned over 180° the dispenser 1 can be placed to stand on a table surface with the bottom of reservoir 2 or with the then lower side of body 5, 6 with its axis 10 oriented vertical so that port 7 is then located in the upper portion at the top end of the dispenser 1.

Units 3, 4 form by remote transverse faces a handle 8, 9 which can be gripped simultaneously by the fingers of one hand of the user and commonly with units 3, 4 mutually moved towards each other by finger pressure while shortening dispenser 1. Handle 8 spaced farther from port 7 may protrude at a spacing from reservoir 2 on both sides of axis 10 at the outer circumference of unit 3 and be formed by body 5 of the bottom portion (not shown) of reservoir 2 simultaneously forming the standing face thereof in the resting position. Handle 9 located more in front, namely more downwards in the operating position (FIG. 1) and more upwards in the resting position is located (FIG. 1) axially and/or radially upstream of port 7 as a depression or (FIG. 2) at the frontmost end of unit 4. Handle 8 provides support for two fingers and handle 9 support for one finger of the same hand. During working stroke unit 4 is sunk in unit 3, but only so far that port 7 and handle 9 always remain outside unit 3. Substantially all components of dispenser 1 are designed symmetrical or rotationally symmetrical to center axis 10. Only the outlet portion and in case of design shown in FIG. 1 handle 9 or an inlet portion deviate from this condition.

Between its ends or axially behind port 7 the dispenser 1 comprises three conveying units 11, to 13. Units 11, 12 adjoin each other axially and unit 13 radially adjoins the rearmost of units 11, 12. Dispenser 1 and units 11 to 13 form medium spaces, conveying paths or falling ducts, namely a transit port 14 for direct feed from reservoir 2, a chamber 15 directly adjoining port 14 for dosing, a transit port 16 directly adjoining chamber 15 for outflow from chamber 15 and a medium space 17 directly adjoining chamber 15 and outlet 16. Space 17 is an outlet or falling duct or buffer reservoir and directly adjoins with its front end orifice 7 via a sloping flow path 18 for the medium. Spaces 14 to 16 belong to unit 11. Space 17 forms a conveying or ejection chamber for the medium, the volume of which is variable by the discharge actuator. Chamber 17 acts as a pressure chamber of unit 12 but is not actually pressurized by volume reduction since orifice 7 is too large for this purpose and like duct 17 is always open or valve-free without cross-sectional changes.

All spaces 14 to 17 are always coaxial to axis 10 from which each space 14 to 17 is radially spaced away by being annular about axis 10. Spaces 14 to 17 adjoining each other and thus merging as conveying paths have differing flow cross-sections and greatest and/or smallest radially spacings from axis 10. The largest like the smallest radial spacings of each space are formed by continuous outer bounds or annular faces, each of which has a constant radial spacing from axis 10 over its circumference. The largest but equal radial spacings of ports 14, 16 are smaller than the largest radial spacings of spaces 15, 17. The largest radial spacing of space 17 is larger than that of space 15. The smallest radial spacing of space 14 is smaller than that of all other spaces 15 to 17. The smallest radial spacing of space 15 is larger than that of space 17. Between the largest and smallest radial spacing the respective space 14 to 17 is free for medium flow all over its circumference.

Totally within unit 4 and as a working member an actuating stem 19 or push rod is located axis 10. Stem 19 extends in one part always at least up to face 18 and into spaces 16, 15 and is non-rotationally and axially fixed to unit 4. Within spaces 14, 15 and flange 6, and also outside of space 17, a core body 20 is located. Core body 20 controls medium flow through the conveying paths in opposing directions, directly adjoins these paths like stem 19, is reversibly and axially and rotationally movable relative to means 2 to 19 and is located totally within units 2, 3 without protruding axially beyond the corresponding unit 3 or 4.

Over most of its length, stem 19 is formed by a tubular jacket 21 made in one part with face 18 forming the chambers 17 bottom opposing outlet 16. Ram 19, 21 or its shell is surrounded at the outer circumference radially spaced by a jacket 22 of unit 4. Port 7 passes shell 22 at a limited circumferential portion. At least over the full length of space 17 walls 21, 22 have stable inner or outer cross-sections. The outer circumference of wall 21 forms the radially inner boundary of space 17 and the inner circumference of shell 22 forms the radially outer boundary thereof. Face 18 directly and at an angle adjoins both bounds to directly seal them off so that in their vicinity the flow cross-section of duct 17 is reduced up to port 7. The rear end of shell 22 protrudes into an annular groove of unit 3, 5. At the outer circumference and at the bottom this groove is bounded by a cap 23 of unit 3, 5. Shell 22 and cap 23 or flange 6 form the outermost and circumferentially entirely freely exposed outer faces of device 1. These faces directly adjoin each other axially and are radially mutually offset.

Second cap 23 formed by a component separate from or in one part with flange 6 has a jacket 24 freely protruding forwards, surrounding spaces 15, 16 but only the rear end of space 17 and beyond the front free end of which unit 4 protrudes with shell 22. An annular spring 25 is located within wall 24 of body 23 and the rear end of shell 22. Coil compression spring 25 returns units 3, 4 on manual release of handles 8, 9 from the working end position indicated dot-dashed or any intermediate position back into the starting position (FIGS. 1, 2), thereby carrying also body 20. Spring 25 is located between the ends of bodies 5, 20 or of chamber 15 which like port 16 protrudes into the rear end of shell 22 or radially spacedly surrounds the rear end of shell 21 in axis 10.

Face 18 and ram 19 are formed by a body separate from the remaining one-part unit 4, 22. This body is located totally within discharge socket 22 with which it can be made in one part. This body has a jacket 26 firmly and frictionally engaging the inner circumference of shell 22. At its rear end shell 22 has an end wall 27 inclined to axis 10, adjoining shells 21, 26 in one part and forming with its outer side face 18. Within and radially spaced from shell 26, shell 21 can extend over the inner side of wall 27 similar to shell 26 up to an end wall 28 of stud 22. The outer side of wall 28 made in one part with shell 22 forms handle 9 and from the inner wall side shells 21, 26 have a minor gap spacing so that the interior of shell 21 forms a conveying path up to port 7.

Wall 29 of cap 23 directly adjoins the annular cap bottom of flange 6 and protrudes radially beyond the outer circumference of flange 6 to form handle 8. From the radially outermost zone of wall 29, shell 24 protrudes forwards only, whilst flange shell 6 protrudes only rearwardly over the outside of wall 29. Only over the inside of wall 29 and radially spaced within wall 24 a shell 70 of the third cap protrudes less far than shell 24. Wall 70 is made in one part with flange 6 and a component separate from cap 23. With its rear end this component directly adjoins the flange bottom or with its outer circumference it directly adjoins wall 29. Walls 24, 29, 70 may be made in one part. Located between the inner circumference of wall 24 and the outer circumference of wall 70 is the rear end of shell 22 which can with scraping action slide on both circumferences. From wall 29 up to its outer end shell 70 has constant outer or inner cross-sections over most of this length. The inner circumference of shell 70 forms the radial outer boundary of spaces 15, 16. The outer circumference of body 20 forms the radially inner bounds of spaces 14, 15. Shell 21 forms the radially inner bounds of spaces 16, 17.

In the vicinity of spaces 14 to 17, 7 control means 30 are effective for filling and emptying these spaces and the reservoir space 2 in opposite flow directions. The rear end of body 20 forms an acutely angled cone-shaped guiding face 31 inclined from axis 10 constantly throughout at an angle of 45°. The end 32 of face 31 is offset forwardly relative to the tip and most remote from axis 10 while forming a projection with an edge 32 from which the medium detaches and is released for free fall while flowing towards opening 16. A depression 33 or annular groove adjoins edge 32 in the forward direction. The rear flank thereof is oriented at right angles to axis 10 and forms the one flank of edge 32. The front flank 34 is inclined by 45° as a obtusely angled cone shaped guiding face 34 and directly adjoins an outer jacket face 35 oriented parallel to axis 10. The front end of face 35 adjoins the bottom face of a depression 36 via a step-face forming the rear flank oriented at right angles to axis 10 and forwardly not bounded by any protruding flank.

Of faces 31 to 36 it is the cylindrical face 35 that is axially longest and has a length about one half bigger than that of face 31. As compared to faces 31, 35 the cylindrical faces 33, 35 and the conical face 34 are essentially shorter since the length of faces 33, 36 is at the most a quarter or a fifth of the length of face 35 and maximally half or a third of the length of face 31. Face 34 is essentially shorter. Face 36 is slightly longer than face 33. The length of each of these faces 31 to 36 is smaller than twice its average spacing from axis 10 so that body 20 forming all faces 31 to 36 commonly in one part can be very short. The spacing of the face 35 from axis 10 is slightly smaller than that of edge 32 and slightly larger than that of faces 33, 36. Face 36 extends up to the free end of body 20.

The outer circumferential faces 31 to 36 form the innermost boundary over the full length of chamber 15 and are nearest to axis 10. The outer boundary 37 radially opposing boundaries 31 to 36 and farther from axis 10 is formed over most of its length by the inner circumference of wall 70. Over a small rear longitudinal or end section boundary 37 is formed by a compressible, resilient and separate seal 38 located at the rear end of shell 17 within wall 29 and flange bottom 6 and forming with its inner circumference a smooth continuation of the cylindrical face 37.

For alternately opening and closing ports 14, 16 or the ends of chamber 15 formed thereby, control means 30 comprise two valves 39, 40 for which body 20 forms one of the valve bodies and body 5 the other valve body, respectively. The movable valve bodies are located at the ends of, and made in one part with body 20, including the associated closing faces 41, 42. The other valve bodies are located at the ends of shell 70 and made in one part with seal 38 or shell 70 including the associated closing faces 43, 44. The annular seal 38 is of angular cross-section, one annular end wall leg being a disk protruding toward axis 10 and only over the inner circumference 37 of the other cylindrical seal leg. The end leg forms with its inner circumference the outer boundary of port 14 having constant width. This boundary flanks the sharp-edged counter face 43 of valve 39 which with a single closing seat forms both the outlet valve for reservoir 2 and the inlet valve for chamber 15. The rear end of seal 38 or the outer end face of the radial seal leg forms simultaneously the sealing face for axial pretensioned support on the annular end face of the reservoir neck. With this neck closing edge 43 can be pushed slightly axially forwards and seal 38 is radially tensioned into support on body 5 whilst being secured in position. Closing face 41 is formed directly by face 31, namely by an annular zone with which face 41 is in edge line contact only and which is located nearer to edge 32 than to the rear end of face 31.

Sharp-edged closing face 42 is formed by the front end of body 20 and is flanked at right angles like edge 36 by its front end face as by face 36. The counter face 44 is inclined relative to axis 10 and is a truncated cone approximating the latter forward at an acute angle. Face 44 adjoins with its wider end directly face 37 in one part, extends up to the front end of shell 70 and forms the radially outer boundary of opening 16 having flow cross-sections reduced in flow direction 64. On this boundary and with spacings between its ends face 42 is supported over its full circumference only in sharp line contact. Closing faces 41, 42, 44 are rigid in response to the operating loads. Face 43 is resiliently and elastically yieldable. The radially outer boundary of space 17 is further spaced from axis 10 than the radially outer boundary of port 16. The latter boundary extends to the end face of shell 70 oriented perpendicular to the axis 10 and flanks an acute angle of a tear off edge for the medium. Valve 40 is an outlet valve for chamber 15 and an inlet valve for chamber 17. Flow through both valves 39, 40 can occur in both directions 64,65.

The chamber 15 can extend from the face 43 up to face 44 at which it ends. Chamber 15 is divided into longitudinal or chamber sections 45 to 47 the adjoining sections of which having different inner or outer radial spacings from axis 10 and thus also different flow cross-sections. Adjoining chamber end 43 is a prechamber 45 linearly reduced in cross-section in flow direction 64. Adjoining port 14, 43 chamber 45 has an abruptly widened flow cross-section which is reduced up to edge 32 and which in its median zone is largest whilst being smallest relative to all other chamber sections in the annular gap or orifice between edge 32 and face 37. Relative to this throttle or gap cross-section the directly adjoining flow cross-section is larger between faces 33, 37 and smaller relative to the mean cross-section of chamber 45 as long as its boundary 31 is in the starting position (FIG. 2). In the flow direction 64 the loosening chamber with face 33 directly adjoins via face 34 an apportioning chamber 46 bounded by faces 35, 37. Chamber 46 has constant flow cross-sections smaller than those in the region of face 33 or the mean cross-section of antechamber 45. Another loosening chamber directly adjoins chamber 46, is bounded by faces 36, 44 and has flow cross-sections larger than those of chamber 46 or as large as those in the region of face 33. This cross-section is constricted in direction 64 up to valve seat 42, 44 at an acute angle of the same pitch as that of the region of port 16 following directly downstream. Faces 33, 36 can be equidistant, from axis 10. In the operating end position of body 20 shown in phantom, the edge 32 and the adjoining end section of face 33 are opposing the resilient inner circumference of seal 38, chamber 45 then being smallest.

Body 20 which may also be composed of several individual bodies, is cap-shaped. Its cap opening open forward is a telescopic guide 48 engaged slidingly and with contact by the outer circumference of shell 21 without medium being able to enter body 20 or opening 48. Body 20 is rearwardly loaded relative to unit 4 by spring 50 supported against the bottom of opening 48 and countersunk against the rear end of shell 21. Coil spring 50 is always compressed or pretensioned like spring 25 surrounding it. To prevent unit 4 from being pulled off from unit 3 in direction 64 a bolt-type intermediate member 49 is provided, traverses and centers spring 50, is firmly seated with its rear end in a reduced connecting bore of opening 48 and is rotatably and longitudinally guided inside shell 21. The connecting bore is a blind hole traversing the bottom of opening 48, extending up into cone 31 and receives the shaft end of member 49 with a pinch fit. This shaft has constant, namely cylindrical cross-sections over its full length.

In the resting position valve 39 is maximally open and valve 40 tightly closed. Rearwardly directed stroke motion of unit 4 over a first partial stroke 51 causes steady constriction of the flow cross-section of valve 39 up to closing and steady widening of the flow cross-section of valve 40 up to complete opening. At the end of partial stroke 51 faces 41, 43 mutually abut. Over the at least 1.5 to two times longer and directly adjoining partial stroke 52 continuing in direction 65 body 20 remains halted relative to unit 3 due to the stopping action. Thereby, unit 4 is moved further rearward relative to bodies 5, 20 counter to spring force 25, 50. With stroke 51 units 4, 20 are synchronously moved, and with start of stroke 52 unit 4 is lifted from a stop 53 of body 20. Stop 53 is formed by an annular bottom face inside shell 21. A widened collar at the front end of member 49 adjoins to stop 53 in the resting position. This collar prevents units 3, 4 from being pulled apart. Stop 53 locks unit 4 relative to body 20 and stop faces 42, 44 lock body 20 relative to unit 3. At the end of stroke 52 a rear end of shell 22 abuts unit 4 against a stop 54. Stop 54 is formed by the inner bottom face of wall 29. When attempting to pull units 3, 4 apart in the resting position, face 42 spreads the front end portion of shell 70. As a result, shell 70 tensions shell 22, 58 and with contact sliding thereon radially against the inside of shell 24.

Unit 13 conveying the second medium is a self priming thrust piston air pump. Its pressure or pump chamber 55 is located inside cap 23 and bounded by the inner circumference of shell 24, the outer circumference of shell 70, the rear end of shell 22 and by the inside of wall 29. At the front end, annular chamber 55 is bounded by a piston 56 firmly or in one part connected to shell 22 and bounded by the annular disk-type end wall 57 thereof. Wall 57 juts radially outwards from the rear end of shell 22 and transitions at its outermost circumference into a jacket 58 oriented forward. Plunger 56 slides with contact on the cited faces of walls 24, 70, and may also be formed by a component separate from and more resilient than body 4, 22. Locking means 59 which prevents units 3, 4 from being pulled apart may also be directly effective between caps 24, 56, for example, as a snap lock catching at the front ends of shells 24, 58.

Piston 56 together with unit 4 is moved synchronously and continuously throughout the full stroke 51, 52 and abuts with its end face at the end of stroke 52 on end face 54 so that then chamber 55 is totally emptied. During a return stroke powered by spring 25, ambient air is drawn into widening chamber 55 through a valve 62 pressure-dependently operating to open and close an inlet port in the piston's bottom wall 57. Over the entire stroke 51, 52, air is forced out of chamber 55 into spaces 15 to 17 and only over stroke 51, does air move through space 14 and reservoir 2 through mouths 61. These are located exclusively in chamber 15 and always downstream of chamber 45 and of edge 32. Ports 61 may be circumferential slots. Ports 61 are oriented radially toward axis 10, are formed by the inner ends of highly constricted nozzle ducts and are located in face 37. These ducts traverse wall 70 in a perpendicular direction and are oriented toward face 33 in the resting position. The axial extension of ports 61 is smaller than that of the face 33. Partial sector-shaped ports 61 may take up most of the associated circumferential extension so that they have the same flow effect over the full circumference of body 20 similar to a continuous ring nozzle.

Therefore, means 60 are formed which divide medium contents within chamber 15 by an annular disk-shaped flow path into two longitudinal sections, namely into a medium section in front of ports 61 and a medium section behind ports 61 and located within chamber 45. Prior to closing valve 39, air inflowing through ports 61 conveys the medium out of chamber 45 also through port 14 back into reservoir 2 and commonly with opening of valve 40, the medium present in chamber sections 46, 47 is conveyed through opening 16 into chamber 17.

The device 1 is suitable for executing the following methods. From the upright standing or the horizontal position the device 1 is taken hold of by one hand and turned so that the front end with port 7 is below. The medium, particularly powder, sinks by its own gravity through port 14 onto face 31 so that its lower portion is provided with a cavity corresponding to cone 31 and filling chamber 45 more or less completely. From the margin of the cavity the medium continues to flow by its gravity over edge 32 as a fine envelope flow through the associated gap and past faces 33, 34 along face 37 into dosing chamber 46 and along faces 36, 44 up to closure 40. From there, medium then climbs in filling these chambers up to edge 32 and, in case, up to completely filling chamber 45. Chamber 15 then can be filled fully with medium which is lightly compacted or subjected to its own weight pressure. In the case of medium which is less prone to flow or trickling this procedure can be assisted by shaking the device manually or by means of vibrating units 2 to 4 when actuated.

Along faces 31 the medium slides at an obtuse angle against and on face 37, whereafter it mainly flows forward parallel to axis 10 in direction 64 until in chamber 47 it flows along face 44 again at an acute angle relative to axis 10. It is compacted by filling chamber 47 in the annular tapered gap formed by faces 36, 44. After chamber 15 has been filled, the device 1 is shortened with discharge actuator 63 formed by units 3, 4 or handles 8, 9 resulting in unit 4 being moved in direction 65 relative to unit 3. With this start of stroke 51 face 42 lifts from face 44 so that chambers 45 to 47 are initially opened steadily per stroke unit before being opened progressively, namely when face 42 passes the rear end of face 44 into the zone of face 37. The length of face 36 is shorter than stroke 51.

During the stroke 51 air also starts to flow from chamber 55 through ports 61 initially against face 33, then against face 34 and finally against face 35 of body 20 passing them. As a result, medium is forced against these faces, loosened and improved in flowability. During the entire stroke 51, piston 31 urges the medium present in chamber 45 back through the constraint of port 14 into reservoir 2. As a result, edge 32 scrapes along the face 37. Part of the inflowing air is also deflected, particularly at face 34, rearwards into the edge gap 32 as also into chamber 45 and port 14. This forces the medium back and the cleaning of faces 41, 43 is assisted. During the entire stroke 51 the flow cross section of valve 39 is continuously reduced until it is closed off by faces 31, 43 coming into contact with each other. Thereby, face 43 closes off medium flow through the annular passage to divide it into separate volume components belonging to reservoir 2 and to chamber 15. Then chamber 45 has a remaining volume which is smaller than the volume of each of chambers 15, 46, 47.

With start of stroke 51 the medium begins to flow from chambers 45 to 47 along funnel face 44, which tapers inward relative to axis 10 out of annular opening 16 towards the outer circumference of ram 19, 21 and uniformly distributed over the circumference into annular chamber 17 having an essentially larger flow cross-section than that of chambers 45 to 47 or ports 14, 16. The flow cross-section of chamber 17 is larger than the sum of cross-sections of spaces 14, 16, 46, namely at most two to three times larger than the flow cross-section of port 14 in the fully opened condition. The latter may be at least two or three times larger than the cross-section of opening 16. The cross-section of chamber 17 may thus be at least three or four times larger than that of port 16. The inner ring boundary of spaces 16, 17 is continuously constant. The outer ring boundary of port 16 passes over stepwise in that of chamber 17. Thereby, the medium is loosened in a first step while leaving edge 42 and in a second step while leaving port 16. From port 16 and through chamber 17 the medium falls onto annular face 18 which in a radial plan view is oblong or elliptical parallel to axis 10. Face 18 extends with its front end up into orifice 7 or passes therethrough (FIG. 2). With the start of stroke 51 face 18 or piston body 26, 27 also starts to wander rearwards, thereby approaching spaces 2, 14, 45, 46, 47, 16 and steadily reducing chamber 17 due to shortening. As a result, the front end of shell 70 also acts as a piston up to which approximately the rear end of face 18 is moved. The chamber volume 17 is then multiply larger than that of chamber 15, 45, 46, 47.

From start to end of stroke 51 the non-rear flowing second portion of air flowing through ports 61 flows forwards and forces medium out of chambers 46, 47 through port 16 into chamber 17 while loosening or atomizing the medium. Thereby, port 16 acts as an atomizing nozzle from which air or conveying flow emerges mixed with medium. Corresponding atomizing nozzles are also formed by the annular gaps at edge 32, at the front edges of faces 35, 36 and with increasing constriction at port 14. From port 16 onwards only flow cross sections essentially widened relative to the above and valve-free are provided up to port 7. Therefore, the blended conveying flow is no longer compacted. From the entire face 18, medium flows around ram 19, 21 and along inner face of shell 22 by its gravity in direction 66 slantingly downwards into port 7 and therefrom out of device 1.

Port 7 may be oblong or rectangular at right angles to axis 10 or circumferentially. Its rear boundary 67 or edge face is inclined parallel to face 18 forming the opposing frontal boundary of port 7. Its flow cross-section is smaller than that of spaces 14, 17 and larger than that of spaces 16, 45, 46, 47. The flow cross-section of duct 17 may be at least two or three times larger than that of port 7. The volume of chamber 17 is always larger than that of chamber 15 so that when the medium leaves the chamber 15 in a corresponding orientation of device 1, it completely remains in chamber 17 before then being able to be discharged from port 7 once the orientation of device 1 has been changed.

During the entire stroke 52 all air flows from ports 61 only against face 35 as well as forwards in direction 64. Thereby, before valve 39 closes the air flow acting on the dosed medium is weaker. With closing motion of valve 39 air flow continuously increases until it remains constant throughout entire stroke 52 and fans face 18. With start of stroke 52 stop 53 lifts or stem 19 begins to move rearwards relative to body 20, further pretensioning spring 50. The collar of member 49 shiftable in shell 21 or some other component may act as piston of a further conveying unit 69. Thereby, a medium, particularly air, is expelled over the entire stroke 52 out of the interior of cylindrical or hollow body 21 in direction 64 against the inner side of wall 28. The air flows deflected on wall 28 orthogonal transverse to axis 10 valve-free to port 7 or a separate outlet 68. Port 68 is formed by the same opening as port 7, separated therefrom by the associated end of face 18 or of walls 26, 27 and slot-shaped transverse to axis 10. Slot 68 comprises side bounds common with port 7. The medium emerging from port 68 as a flow carpet catches the medium detaching from face 18 and endows it after leaving port 7 in a corresponding stabilized flow direction.

At the end of stroke 51, 52 actuator 63 is released so that unit 4 or units 11 to 13, 69 return by spring 25 to the starting position. During a first return stroke 52, valve 39 remains closed and valve 40 is fully opened. Therefore, in the output position, no medium is able to flow through opening 14 into chamber 15. Only over a second return stroke 51, unit 4 carries body 20 counter to direction 65. Thereby, valve 39 opens and valve 40 closes. The stroke direction 65 of unit 4 is parallel but counter to direction 64 is the closing direction of face 41 and the opening direction of face 42.

If only few individual dosages of medium need to be discharged, body 6 may also form the reservoir and its rear end can be closed off by a bottom. If the device is intended as a single-discharge or unidirectional stroke dispenser for discharging only a single dosage body 6, valve 39 can be eliminated, and chamber 15 can be closed off by wall 29 or the like at port 14. At the end of opening stroke of valve 40, body 20 can be caused to abut against this closure 40, for example, in the plane of face 43. In this case spring 25 may also be eliminated and spring 50 replaced by a snap-action catch or the like which positions parts 20, 21 relative to each other over stroke 51 and then resiliently abruptly releases their mutual locking upon actuating pressure.

For assembly, one-part body 6, 70 is inserted axially in direction 64 into body 23, whereby it may already be preassembled with bodies 20, 38. These too are inserted in direction 64 into body 6, 70. After being preassembled with body 49 and, in case, with body 50, ram 19 is inserted in direction 64 into body 22, 28, 56. Thereafter, this preassembled unit is inserted in direction 65 into bodies 23, 70, 20. Body 69 too is inserted in direction 65 into ram 19.

In FIGS. 3, 4 corresponding parts have the same reference numerals as in FIGS. 1, 2, but indexed "a". All features of both embodiments may be provided in each other embodiment in addition thereto or in combination therewith. A dispenser is conceivable as a unit containing both embodiments axially juxtaposed or axially parallel adjoining. The description of the embodiments thus applies in sense to all embodiments.

In FIGS. 3, 4 reservoir 2a is a body of plastics directly connected to unit 3a, e.g. by a snap connector 6a. Thus outer and equally wide circumferences of reservoir 2a and unit 3a go over smoothly and gap-free into each other. In one part emanating from the inner circumference of outer shell of reservoir 2a and spaced from both ends of this shell is a funnel 71 continuously constricted at an acute angle in direction 64a. The lower end of duct 71 bounds the short, cylindrical port 14a also forming closing face 43a of slide valve 39a. From port 14a in direction 65a a projection, such as a tube socket 72 made in one part with funnel 71, freely juts into the entire funnel 71. The tubular jacket of socket 72 has multiple circumferentially distributed ports or axial slotted openings 73 extending over its full length. Medium is able to flow therethrough from the cross-sectionally annular funnel space radially inwards into socket 72 by the force of gravity. The upper end of socket 72 is closed off and forms a slanting or pointed and conical guide face which uniformly over the full circumference guides the medium away from axis 10a on the outer circumference of socket 72 and thus into ports 73 or against the funnel face 71.

In the starting position body 20a extends roughly over half its length into stationary socket 72 and forms an acute-angled guide face 31a which is located in this position totally within socket 72 and over its full length in the zone of port 73 extending up to port 14a. Edge 32a is formed by a shoulder face directly angularly adjoining the widened end of guide face 31a and in the starting position is directly juxtaposed with and located upstream of opening 14a in the region of the associated ends of the ports 73 and funnel face. Port 14a has constant inner and outer cross-sections over its length. Section 33a forms the radially inner boundary of port 14a.

With its constricted end funnel 71 juts in direction 64a freely into chamber 15a. Thereby, opening 14a like valve 39a is also spaced from the upstream end of chamber 15a. The cited shoulder face serves to support the lower end of the sole spring 25a which is always located entirely within socket 72. There it loosens the medium by spring motions along the inner side of ports 73 and is supported by its upper end at the upper end wall of socket 72. At the end of the working stroke body 20a does not reach this end wall, but protrudes therein with guide face 31a.

The volume of chamber 15a is continuously variable by being axially shortenable with constant width. The lower length section of chamber 15a, port 7a, face 44a and chamber 47a are formed by shell 42a of unit 4 and move synchronously in direction 65a by working stroke. For that a piston lip 76 is provided at the upper end of shell 22a spaced above wall 57a. Lip 76 is made in one part with shell 22 and sealingly runs on the outer circumference of shell 70a while sealing chambers 15a, 55a from each other as a slide seal. A corresponding lip 77 of plunger 56a protrudes beyond wall 57a and slides on the inner circumference of shell 24a. Chambers 15a, 55a are thus synchronously made smaller with the working stroke. Shell 70a freely jutting downwards adjoins wall 29a. The outside of wall 29a is totally covered by reservoir 2a. From this outside axially acting snap members 6a protrude. Funnel 71 is sealingly supported with an annular projection on this outside.

In the starting position face 34a and directly adjoining face 41a are spaced below face 43a. Face 41a is formed by face 35a which continues with constant width over the entire corresponding stroke path or up to end 36a. After reaching conical face 43a face 35a keeps valve 39a closed over the remaining stroke. Ports 61a are located in the uppermost zone of chamber 15a above opening 14a and are closed by a pressure-dependently operating valve 74. Annular or shell-shaped valve body 75 is made in one part with funnel 71. Body 75 axially freely protrudes from the outer circumference of funnel 71, is inherently spring-resilient and contacts circumference 37a to cover ports 61a. On over-pressure in chamber 55a body 75 is resiliently constricted radially and conically inwardly. Air then flows directly below port 14a against circumference 33a, 34a, 35a.

Annular port 7a is located in axis 10, formed by the lower end of shell 70a, 22a and thus coincides with port 16a. For this the lower end of shell 22a has slotted exit ports distributed over the circumference and extending up to the lower end edge 67a of shell 22a. This end constitutes a cylindrical continuation of funnel face 44a and forms snap members of prevention means 59a which secure a carrier 78 for body 20a. Driver 78 is formed by the upper end of ram section 21a and fixedly connected to a stop 79. Only at the end of stroke 51a and after fully opening valve 40a, stop 79 carries unit 4a, part 22a and piston 56a along.

Emptying out of port 7a occurs into a collecting vessel, namely a cup 80 completely removable from the device in direction 64*a* counter the force of snap 59*a*. Cup 80 is made in one part with members 21*a*, 26*a*, 28*a* and 79. Cup 80 slidingly and sealingly contacts with the outer circumference of its shell 26*a* the inner circumference of shell 58*a*. Annular stop 79 protrudes beyond the outer circumference of shell 26*a*. Stop 79 opposes the lower end face of shell 58*a*.

At the start of actuation, cup 80 forming the actuating member 9*a* is shifted relative to unit 4*a* and chamber 15*a* in direction 65*a*. Thereby, carrier 78 drives body 20*a*. Thus valve 40*a* is completely opened, whilst valve 39*a* is not yet closed. One-part unit 4*a* thus has opening 48*a* for insertably and shiftingly receiving shell 26*a* and section 21*a*. Ram 21*a* has at its upper end a snap member or an annular collar protruding beyond its outer circumference. Additional to end 36*a* this collar forms with its outer circumference face 42*a* or a valve slide face which together with the inner circumference of the lower end of shell 22*a* forms a further closure of valve 40*a*. After a first part of stroke 51*a* and after the end 36*a* has already opened, this slide closure also opens. Then medium can flow around ram 21*a* between snap members into cup 80 directly onto the bottom face 18*a*. Face 18*a* slopes at an obtuse angle conically from ram 21*a* radially outwards down to shell 26*a* and is located in the same plane as stop 79. Stop 79 now abuts unit 4*a* and stroke 52*a* starts. Only now chambers 15, 55*a* are constricted. Only after a first path of stroke 52*a* valve 39*a* closes. Prior to and after that compressed air flows through ports 61*a* behind the medium exiting port 14*a* to accelerate or force it out of port 7*a*, 16*a*.

After release and return of device 1*a* to its starting position cup 80 is withdrawn downwards out of unit 4*a* so that its medium contents can be tipped out. Before this, the annular cup space is sealingly closed off from the ambient by unit 4*a*. The lower end face of cup 80, like face 9, forms a standing or actuating face 9*a* by placing the device 1*a* on a table top with face 9, 9*a* and then pressing unit 3*a* downwards to execute the stroke. Multiple valves 62*a* are provided in wall 29*a*. In the region of faces 33*a*, 34*a* the cross-section of chamber 15*a* is rather smaller than in the region of face 35*a* and of end 36*a*. The lower end of chamber 17*a* is formed by cup 80. Face 9*a* is formed by a dish- or cup-shaped foot 85 protruding radially beyond the outer circumferences of units 2*a*, 3*a*, 4*a*. The cup bottom is on top and forms stop 79 as also vessel bottom 28*a* from which ram 21*a* juts upwards in one part to have member 78 located below the upper end of shell 26*a*. Base 85 forms also a handle for pulling out cup 80.

For incrementally varying the volume filling chamber 15*a* for receiving the dosing volume setting means 81 are provided which continuously vary the starting position between units 3*a*, 4*a* so that only stroke length 52*a* is varied. Full opening of valve 40*a* by the third shifting unit 80 is always sure. A setting cam 53*a* is made in one part with and juts radially outward from shell 58*a* to pass through a slope or winder guide 82 in the lower end of shell 24*a*. Mutual rotational motions of units 3*a*, 4*a* positively result in mutual axial motions. Parallel stroke guides 83 emanate transversely in direction 65*a* from guide 82 for cam 53*a*. The ends of guides 83 remote from guide 82 form stops 54*a* located in a common height to always assure the same final stroke position. Guides 83 differ in length incrementally. Opposing each stroke guide 83 guide 82 forms a catch 84 in which cam 53*a* is locked in the starting position by spring 25*a* against motions along guide 82, but not against stroke motions. Thus a correspondingly large rotary force overcomes the locking stress. Laterally adjacent to the longest guide 83 an assembly insertion orifice emanates from the lower end edge of shell 24*a* which resiliently widens on assembly insertion to then snap back so that it serves as a positive withdrawal preventor between units 3*a*, 4*a*.

At this onset of guide 82 cam 53*a* is fixed against directions 64*a*, 65*a* and positionally secured against rotational motions toward the other end of guide 82 by a resilient catch, for example a cam of shell 24*a*. In this initial position of means 81 the units 2*a*, 3*a* are thus positively locked against mutual shifting in directions 64*a*, 65*a*. On the outer circumference of shell 24*a* a handle is located and made in one part with cam 53*a* for manually turning unit 4*a* relative to unit 3*a*.

In the locked position the device 1*a* may also be secured to be childproof. Cam 53*a* in its radial length direction can have adjoining sections differing in width, only the section located at the handle is suitable for overcoming the rotation catch and is located radially outside of this catch when the handle is unactuated. Only by pressure exerted radially inwards on the handle this cam section can be brought into the region of the catch and then transposed into guide 82. These safety means act even better when two identical but diametrically opposed handles are provided for cam control 81, requiring both to be pressed simultaneously for unlocking.

Reservoir 2*a* is sealingly closed at the upper end by an openable cover 86 for refilling. Cover 86 forms handle 8*a* and has inside a chamber sealed from the ambient. This chamber is filled with a dessicant or moist adsorbant and connected to the reservoir chamber only via a partition 87 permeable to moisture and gas. Partition 87 can close off the sole filling port of this chamber and may be a disk or a filter which is impermeable for the medium. Therefore the stored medium, particularly a dry medium, is protected from moisture.

The air accelerating the flow of the medium cleans all conveying paths of the medium. Thereby, very narrow dosing limits can be maintained. This is improved if the boundary faces of medium spaces 7, 7*a* and 14, 14*a* to 17, 17*a* as also guide face 18 or the interior of cup 80, namely all faces coming in contact with the medium, have a coating acting as an anti-sticking or anti-static surface of metal and/or a plastics such as tetrafluoroethylene. Thereby, sticking of the medium due to electrostatic charging or the like is prevented. The coating is only a few $\mu$m thin and can be applied to the faces by lacquering, bonding, embossing, pressure rolling or the like.

What is claimed is:

1. A dispenser for discharging media comprising:
    a base body (5) for connecting to a medium reservoir (2);
    a medium chamber (15) connecting to said base body (5) and adjoining at least one passage orifice (14, 16) for the medium, said medium chamber (15) and said at least one passage orifice (14, 16) bounding medium spaces and defining a flow direction (64); and
    a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity, said base body (5) including a connector (6) separate from the medium reservoir (2), said dispenser (1) being a preassembled unit connectable to the medium reservoir (2) with said connector (6).

2. The dispenser according to claim 1, wherein said hauling means are provided for transferring the medium at least one of into said medium chamber (15), and
out of said medium chamber (15),
said passage orifice (14, 16) including an inlet port (14) and an outlet port (16) separate from said inlet port (14), when in at least one of said spatial orientations said flow directions (64) of at least two of said medium spaces (14 to 17) being oriented substantially unidirectional, said dispenser (1) being manually holdable and actuatable with a single hand of a user.

3. The dispenser according to claim 1 and further defining passage widths of said at least one passage orifice (14, 16) which includes first and second passage orifices, said passage widths including a largest width and a smallest width, wherein control means (30) are included for substantially continuously varying said passage widths of at least one of said first and second passage orifices (14, 16) from said largest width to said smallest width and back to substantially said largest width, said first passage orifice (14) being located and spaced upstream from said second passage orifice (16), said medium chamber (15) extending from said first passage orifice (14) up to said second passage orifice (16) and defining passage cross-sections (45 to 47) which are successively narrowed and widened in said flow direction (64) and between said first and second passage orifices (14, 16).

4. The dispenser according to claim 3, wherein said control means (30) are provided for commonly varying said passage widths of at least two of said first and second passage orifices (14, 16), said control means (30) including constrained positive control for opening one of said first and second passage orifices and simultaneously closing the other passage orifice.

5. The dispenser according to claim 2, wherein said actuator (63) includes a first actuating unit (3) and a said actuating unit (4) manually displaceable with respect to said first actuating unit (3) over an actuating path and including said medium outlet (7), control means (30) being included for opening and closing at least one of said medium spaces (14 to 17) path dependently with respect to said actuating path (51, 52), said first actuating unit (3) including said connector (6) for rigidly connecting said dispenser (1) to the medium reservoir (2).

6. The dispenser according to claim 2, wherein said discharge position said flow direction (64) is oriented substantially linearly downwards from the medium reservoir (2) through said medium chamber (15) up to said medium outlet (7), said inlet port (14) directly adjoining said medium reservoir (2) and said medium chamber (15), said inlet port (14) being significantly shorter and narrower than said medium reservoir (2) and said medium chamber (15), at least one of said medium spaces (14 to 17) being substantially entirely annular, said medium chamber defining a center axis (10) and including at least one chamber boundary (33, 35, 36, 37) oriented substantially parallel to said center axis (10), in an initial state of said dispenser (1) said at least one chamber boundary (33, 35, 36, 37) at least twice discontinuously directly connecting in one part to a guide face (31, 34, 44) for the medium.

7. A dispenser for discharging media comprising:
a base body (5) for connecting to a medium reservoir (2);
a medium chamber (15) connecting to said base body (5) and adjoining at least one passage orifice (14, 16) for the medium, said medium chamber (15) and said at least one passage orifice (14, 16) bounding medium spaces and defining a flow direction (64);
a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and
a control body (20) displaceable with said discharge actuator (63), wherein said control body (20) is displaceable with respect to at least one of said medium spaces (14 to 17), said control body (20) being located inside at least one of said medium spaces (14, 15) and including a radially inner bound (31 to 36) of said at least one medium space (14, 15), said control body (20) being initially displaceable with respect to said base body (5) and thereafter with respect to said medium outlet (7) upon actuating said discharge actuator (63).

8. A dispenser for discharging media comprising:
a base body (5) for connecting to a medium reservoir (2);
a medium chamber (15) connecting to said base body (5) and adjoining at least one passage orifice (14, 16) for the medium, said medium chamber (15) and said at least one passage orifice (14, 16) bounding medium spaces and defining a flow direction (64);
a discharge actuator (63) for discharging the medium out of a medium outlet (7) when said dispenser (1) is spatially oriented in one of a plurality of spatial orientations to achieve a dispensing, wherein said medium spaces include medium paths (14 to 18, 7), and means for conveying the medium through at least one of said medium spaces substantially exclusively by action of gravity and declivity; and
a closing body (31, 36) for closing at least one of said medium spaces (2, 14 to 17), wherein said closing body includes a first closing body (31) and a second closing body (36) spaced from said first closing body (31), said first and second closing bodies (31, 36) being actuable to perform a control motion defining an operating direction (64, 65), over said control motion said first and second control bodies (31, 36) being substantially rigidly interconnected with respect to said operating direction (64, 65) said closing body (31, 36) being substantially entirely located within said medium chamber (15).

9. The dispenser according to claim 1 and further including at least one closure seat for closing at least one of said medium spaces (2, 14 to 17), wherein said closing seat includes a first closing face (42, 43) and a second closing face (41, 44) displaceable with respect to said first closing face (42, 43) for closing and opening said closure seat, said first closing face (42, 43) being sharp-edged and supportable directly against said second closing face (41, 44) for closing said closure seat, said second closing face (41, 44) including an inclined wedge face, said medium chamber (15) including a first chamber section (45, 47) defining a first passage cross-section and a second chamber section (46) defining a second passage cross-section which is smaller than said first passage cross-section, when said closure seat is opened said first closing face (42, 43) directly connecting to said first chamber section (45, 47) and bounding said first passage cross-section.

10. The dispenser according to claim 9, wherein said at least one passage orifice (14, 16) includes first and second orifices including an inlet port (14) for supplying said medium chamber (15) with the medium an outlet port (16) for emptying said medium chamber (15), said second closing face (41, 44) of each of said first and second orifices (14, 16) including a subwedge of said wedge face, said subwedges being opposingly inclined, said subwedge of said inlet port (16) including a substantially pointed cone (31).

11. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and power means (25, 50) for closing said passage orifices (14, 16) with a closing stress, wherein said passage orifices includes a first orifice (14) and a second orifice (16) separate from said first orifice (14) and directly connecting to said medium chamber (15), said first orifice (14) directly connecting to said medium chamber (14), said closing stress including a first stress closing said first orifice (14) and a second stress closing said second orifice (16), said second stress being higher than said first closing stress.

12. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of orientations to achieve a dispensing position, wherein said medium spaces include medium paths (14 to 18, 7), and means for conveying the medium through at least one of said medium spaces substantially exclusively by action of gravity and declivity; and a port center of said passage orifice (14) and an inner bound (37, 43a) of said medium chamber (15, 15a), wherein a guide face (31, 31a, 71) is included and extends askew substantially from said port center towards said bound (37, 43a, 33a), said guide face connecting to said passage orifice (14, 14a) and including a break edge (32, 32a) for abruptly freeing the medium while passing.

13. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and wherein said actuator (63) includes a first actuating unit (3) and a said actuating unit (4) manually displaceable with respect to said first actuating unit (3) over an actuating path and including said medium outlet (7), control means (30) being included for opening and closing at least one of said medium spaces (14 to 17) path dependently with respect to said actuating path (51, 52), said first actuating unit (3) including said connector (6) for rigidly connecting said dispenser (1) to the medium reservoir (2); and a control body (20) displaceable with said discharge actuator (63) including an actuating stem (19, 19a), wherein said actuating stem (19, 19a) has a length extension which is variable, said actuating stem (19, 19a) resiliently displacing said control body (20) counter to said flow direction (64), said actuating stem (19) including a first stem section and a second stem section (21) longitudinally displaceable with said second actuating unit (4) firstly commonly with said control body (20) and secondly separately from said control body (20).

14. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and wherein said medium chamber (15) includes a first chamber end and a second chamber end remote from said first chamber end, from said first chamber end to said second chamber end said medium chamber (15) including first, second, third and fourth passage cross-sections (32, 33, 35, 36) interconnected unidirectionally parallel to said flow direction (64), said first passage cross-section (32) including a narrow passage gap, said second passage cross-section (33) being widened with respect to said first passage cross-section (32), said third passage cross-section (35) being narrowed with respect to said second passage cross-section (33) and at least as large as said first passage cross-section (32), a cross sectional step connecting said third passage cross-section (35) with said fourth passage cross-section (36), said forth passage cross-section steadily decreasing downstream (64), at least two of said first, second, third and fourth passage cross-sections (32, 33, 35, 36) being bounded by an inner circumferential face (37) which is substantially constantly wide over said at least two passage cross-sections (32, 33, 35, 36).

15. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and an outlet duct (17) including said medium outlet (7), wherein said outlet duct is a gravity duct (17) directly connecting to said medium chamber (15), said outlet duct (17) being annular and defining a passage cross-section bigger than a passage cross-section of said medium chamber (15).

16. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and an outlet duct (17) including said medium outlet (7) wherein said outlet duct (17) is volumetrically variable with said discharge actuator (63), a downstream end of said outlet duct (17) being substantially entirely bounded by an inclined guiding face (18) extending substantially up to said medium outlet (7).

17. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and thrust means (60) for conveying the medium, wherein said thrust means (60) are operable with said discharge actuator (63) and provided for positively pushing the medium out of said medium chamber (15) in at least one of said flow direction (64) and a direction (65) counter to said flow direction.

18. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and wherein said thrust means (60) including a generator (13) for expelling a carrier flow separate from the medium and a control body (20) directly pushing the medium.

19. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and wherein said medium chamber (15) includes an antechamber (45) and a dosing chamber (46) connecting downstream directly to said antechamber (45), said antechamber (45) being volumetrically variable, means (60) being included for reemptying said antechamber (45) into the medium reservoir (2) counter to gravity, said means (60) including a push piston (31) for pushing the medium back through said passage orifice (14).

20. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing, wherein said medium spaces include medium paths (14 to 18, 7), and means for conveying the medium through at least one of said medium spaces substantially exclusively by action of gravity and declivity; and a pressure chamber (55), wherein said pressure chamber (55) envelopes said medium chamber (15), said pressure chamber (55) connecting to said medium outlet (7).

21. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and wherein when in an initial state said medium chamber (15) defines a chamber volume, setting means (81) being included for manually varying said chamber volume.

22. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said at least one passage orifice (14, 16) bounding medium spaces and defining a flow direction (64);

a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7), and means for conveying the medium through at least one of said medium spaces substantially exclusively by action of gravity and declivity; and a drip pan (80) for directly receiving the medium from said medium outlet (7a), wherein holding means are included for releaseably connecting said drip pan (80) with said base body (5).

23. The dispenser according to claim 22, wherein said discharge actuator (63a) includes said drip pan (80) including an actuating stem (21a).

24. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said passage orifice (14, 16) bounding medium spaces and defining a flow direction (64); and a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7) and means for conveying the medium through at least one of said medium spaces substantially exclusively by action of gravity and declivity, a control body (20) being included and displaceable with said discharge actuator (63) which includes an actuating stem (19, 19a), said actuating stem (19, 19a) having a length extension which is variable, said actuating stem (19, 19a) resiliently displacing said control body (20) counter to said flow direction (64), said actuating stem (19) including a first stem section and a second stem section (21) longitudinally displaceable with said discharge actuator (63) firstly commonly with said control body (20) and secondly separately from said control body (20).

25. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said passage orifice (14, 16) bounding medium spaces and defining a flow direction (64); and a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7) and means for conveying the medium through at least one of said medium spaces substantially exclusively by action of gravity and declivity, said medium chamber (15) including a first chamber end and a second chamber end remote from said first chamber end, from said first chamber end to said second chamber end said medium chamber (15) including first, second and third passage cross-sections (32, 33, 36) interconnected unidirectionally parallel to said flow direction (64), said first passage cross-section (32) including a narrow passage gap, said second and third passage cross-sections (33, 36) being widened with respect to said first passage cross-section (32).

26. The dispenser according to claim 25, wherein said second passage cross-section (33) is located between said first and third passage cross-sections (32, 36), a fourth passage cross-section (35) being located between said second and third passage cross-sections (33, 36), said fourth passage cross-section (35) being dimensionally different from both said second and third passage cross-sections (33, 36), at least one cross-sectional step (34) being included and directly interconnecting at least one of:

said first and second passage cross-sections (32, 33);

said second and fourth passage cross-sections (33, 35); and said fourth and third passage cross-sections (35, 36).

27. A dispenser for discharging media comprising:

a base body (5) for connecting to a medium reservoir (2);

a medium chamber (15) connecting to said base body (5) and adjoining at least one passage orifice (14, 16) for the medium, said medium chamber (15) and said passage orifice (14, 16) bounding medium spaces and defining a flow direction (64); and a discharge actuator (63) for discharging the medium out of a medium outlet (7) when said dispenser (1) is spatially oriented in one of a plurality of spatial orientations to achieve a dispensing position, wherein said medium spaces include medium paths (14 to 18, 7) and means for conveying the medium through at least one of said medium spaces substantially exclusively by action of gravity and declivity, an outlet duct (17) being included and including said medium outlet (7), a downstream end of said outlet duct (17) being substantially entirely bounded by an inclined guiding face (18) extending substantially up to said medium outlet (7), said inclined guiding face (18) being substantially planar and annular.

* * * * *